US012562535B2

(12) United States Patent
Lee et al.

(10) Patent No.: US 12,562,535 B2
(45) Date of Patent: Feb. 24, 2026

(54) METHOD FOR DETECTING UNDESIRED CONNECTION ON PRINTED CIRCUIT BOARD

(71) Applicant: National Tsing Hua University, Hsinchu (TW)

(72) Inventors: Ming-Tsang Lee, Hsinchu (TW); Wei-Chih Chen, Hsinchu (TW); Jia-Wei Lu, Hsinchu (TW); Yu-Bin Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 587 days.

(21) Appl. No.: 17/874,075

(22) Filed: Jul. 26, 2022

(65) Prior Publication Data

US 2023/0118709 A1     Apr. 20, 2023

(30) Foreign Application Priority Data

Oct. 20, 2021    (TW) .................................. 110138838

(51) Int. Cl.
| | |
|---|---|
| *G06T 7/12* | (2017.01) |
| *G06T 7/136* | (2017.01) |
| *H01R 13/66* | (2006.01) |

(52) U.S. Cl.
CPC ........... *H01R 13/6683* (2013.01); *G06T 7/12* (2017.01); *G06T 7/136* (2017.01)

(58) Field of Classification Search
CPC ....... H01R 13/6683; G06T 7/12; G06T 7/136; G06T 2207/30141; G06T 7/001
See application file for complete search history.

(56) References Cited

U.S. PATENT DOCUMENTS

| | | | |
|---|---|---|---|
| 11,216,932 B1 * | 1/2022 | Checka ................ | G06N 3/0464 |
| 2005/0169514 A1 * | 8/2005 | Prince ....................... | G06T 7/44 |
| | | | 382/150 |

FOREIGN PATENT DOCUMENTS

| | | | | |
|---|---|---|---|---|
| CN | 103500459 A | 1/2014 | | |
| CN | 106228543 A | 12/2016 | | |
| JP | 4249966 B2 * | 4/2009 | .............. | G06T 7/44 |
| TW | 519571 B | 2/2003 | | |

\* cited by examiner

*Primary Examiner* — Vu Le
*Assistant Examiner* — Zaid Muhammad Saleh
(74) *Attorney, Agent, or Firm* — Birch, Stewart, Kolasch & Birch, LLP

(57) ABSTRACT

A method for detecting an undesired connection forming a short circuit on a printed circuit board (PCB) based on an original image of the PCB includes steps of: performing binarization on the original image to generate a binary image that has an external boundary; determining, on the binary image, a trace area that corresponds to a trace of the PCB; determining whether the trace area contacts the external boundary of the binary image at four places; and determining that the trace that corresponds to the trace area has an undesired connection forming a short circuit when it is determined that the trace area contacts the external boundary of the binary image at four places.

18 Claims, 5 Drawing Sheets

METHOD FOR DETECTING UNDESIRED CONNECTION ON PRINTED CIRCUIT BOARD

CROSS-REFERENCE TO RELATED APPLICATION

This application claims priority of Taiwanese Invention Patent Application No. 110138838, filed on Oct. 20, 2021.

FIELD

The disclosure relates to a method for detecting an undesired connection forming a short circuit on a printed circuit board (PCB) based on an image of the PCB.

BACKGROUND

In order to detect a defect (e.g., an undesired connection forming a short circuit) on a printed circuit board (PCB), a conventional approach usually requires a layout file of a defect-free reference circuit and compares the PCB with the layout file. Alternatively, a machine-learning-based approach requires a great amount of image data for training a model to detect a defect based on an image of the PCB.

SUMMARY

Therefore, an object of the disclosure is to provide a method for detecting an undesired connection forming a short circuit on a printed circuit board (PCB) based on an image of the PCB that can alleviate at least one of the drawbacks of the prior art.

According to the disclosure, the method includes steps of:
performing binarization on the original image to generate a binary image that has an external boundary;
identifying a trace area on the binary image, wherein the trace area corresponds to a trace of the PCB;
determining whether the trace area contacts the external boundary of the binary image at four places; and
determining that the trace that corresponds to the trace area has an undesired connection forming a short circuit when it is determined that the trace area contacts the external boundary of the binary image at four places.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
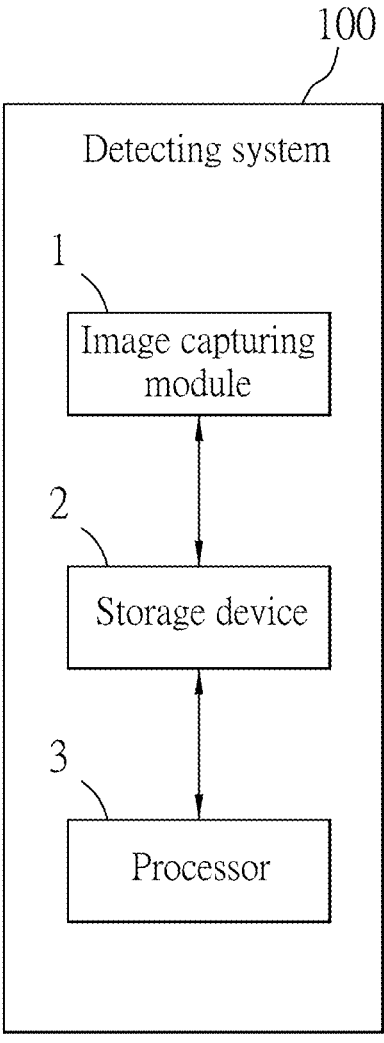
FIG. 1 is a block diagram illustrating an example of a detecting system according to an embodiment of the disclosure.

FIG. 1 illustrates an embodiment of a detecting system 100 that is used to implement a method for detecting an undesired connection forming a short circuit on a printed circuit board (PCB) based on an image of the PCB according to the disclosure. The PCB generally has a substrate on which a plurality of traces are formed. Ideally, each trace in the original image is a straight line segment, and is not connected to another trace. The traces are generally parallel to each other, but may be non-parallel to each other in some embodiments.

The detecting system 100 includes an image capturing module 1, a storage device 2 and a processor 3 that are electrically connected to each other.

The image capturing module 1 may be implemented by a camera or a video recorder. The image capturing module 1 is positioned at an inspection station of a PCB production line, and is configured to capture image(s) of PCB(s).

The storage device 2 may be implemented by random access memory (RAM), double data rate synchronous dynamic random access memory (DDR SDRAM), read only memory (ROM), programmable ROM (PROM), flash memory, a hard disk drive (HDD) or a solid state disk (SSD), electrically-erasable programmable read-only memory (EEPROM) or any other volatile/non-volatile memory devices, but is not limited thereto. The storage device 2 is configured to store image(s) captured by the image capturing module 1 and data generated by the processor 3. In this embodiment, the storage device 2 stores instructions that, when executed by the processor 3, cause the processor 3 to implement the operations of the method for detecting an undesired connection as described below.

The processor 3 may be implemented by a central processing unit (CPU), a microprocessor, a micro control unit (MCU), a system on a chip (SoC), or any circuit configurable/programmable in a software manner and/or hardware manner to implement functionalities discussed in this disclosure. The processor 3 is configured to implement techniques of image recognition.

Figure 2:
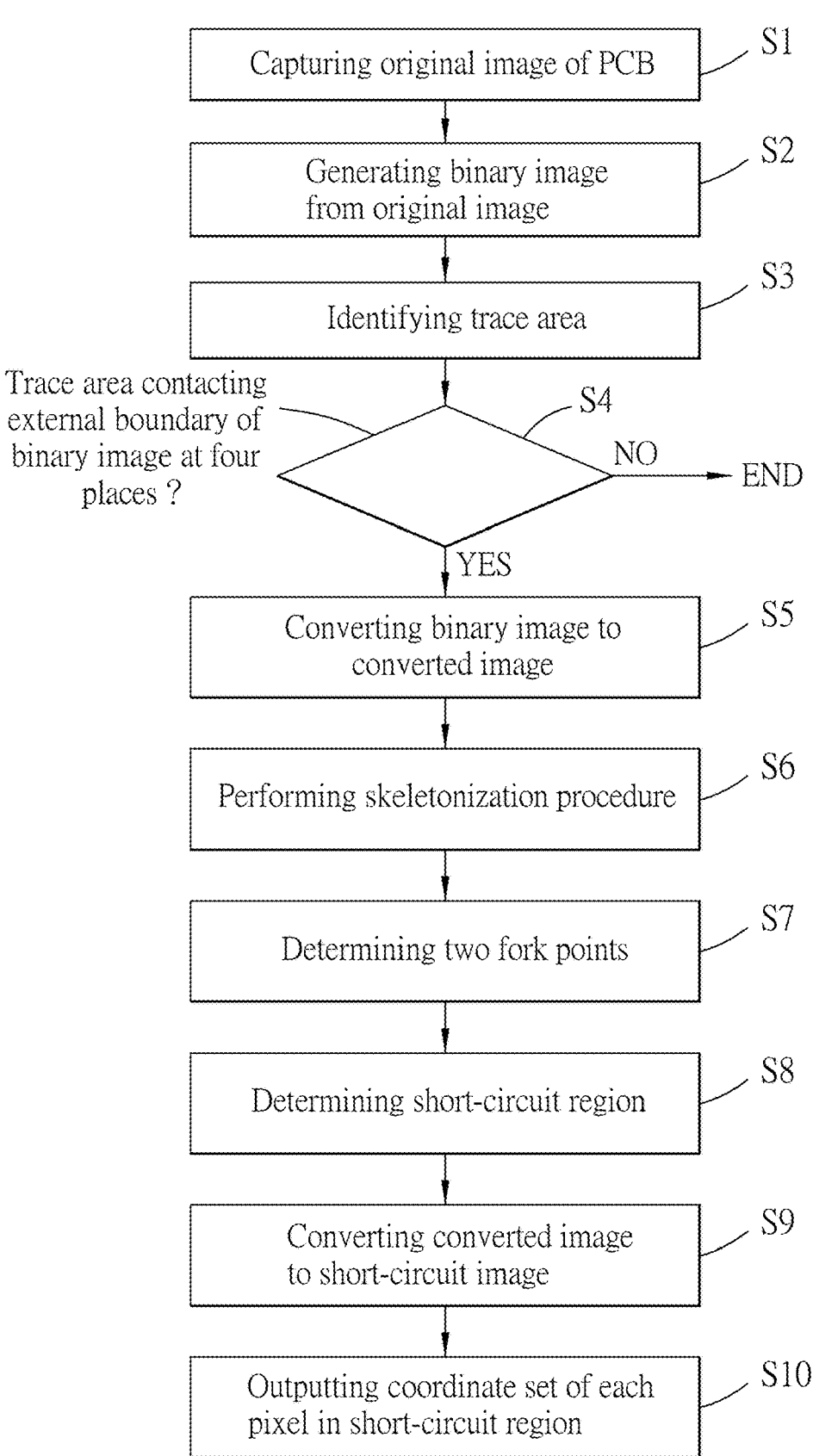
FIG. 2 is a flow chart illustrating a method for detecting an undesired connection forming a short circuit on a printed circuit board (PCB) according to an embodiment of the disclosure.

Referring to FIG. 2, an embodiment of the method for detecting an undesired connection is illustrated. The method includes steps S1 to S10 delineated below.

In step S1, the processor 3 controls the image capturing module 1 to capture an original image of a PCB. The original image is a color image. In this embodiment, the original image is rectangular in shape, and has an image size of 240×240 pixels.

In step S2, the processor 3 performs binarization on the original image to generate a binary image. The binary image has an external boundary, and has a plurality of pixels each having either a first pixel value (e.g., one) or a second pixel value (e.g., zero). A pixel having the first pixel value is presented in white color, and a pixel having the second pixel value is presented in black color. However, in some embodiments, a pixel having the first pixel value is presented in black color, and a pixel having the second pixel value is presented in white color. In this embodiment, the external boundary is rectangular in shape, and the image size of the binary image is 240×240 pixels as well.

It should be noted that specifications related to the original image and the binary image (e.g., the image size and the shape thereof) are not limited to the disclosure herein and may vary in other embodiments.

In one embodiment, the original image is stored in advance in the storage device 2, and the processor 3 reads the original image from the storage device 2 before performing binarization on the original image.

In one embodiment, the processor 3 divides the original image into a plurality of divided images, and performs binarization on the divided images to generate binary images, respectively.

In step S3, the processor 3 identifies at least one trace area on the binary image, wherein the at least one trace area corresponds to at least one trace of the PCB. The trace area that corresponds to the trace on the PCB has a plurality of pixels each having the first pixel value.

In one embodiment, the processor 3 identifies the trace area that corresponds to the trace based on pixel values of the binary image. Specifically, an area on the binary image whose pixels all have the first pixel value is identified as a trace area.

In one embodiment, the processor 3 identifies the trace area that corresponds to the trace by using edge detection and topological structure analysis to obtain a contour of the trace area. Specifically, the contour of the trace area is composed of at least two parts of two opposite sides of the external boundary of the binary image, and at least two black-and-white boundaries each between a white portion and a black portion of the binary image (see for example, element 42 in FIG. 3). That is to say, the contour of the trace area is a closed loop extending along the black-and-white boundaries and the parts of the external boundary.

The following steps S4 to S10 are performed with respect to each of the at least one trace area on the binary image.

In step S4, the processor 3 determines whether the trace area contacts the external boundary of the binary image at four places. If the trace area is determined as contacting the external boundary of the binary image at four places, a procedure flow of the method proceeds to step S5 with respect to the trace area. Otherwise, the method is terminated with respect to the trace area.

In step S5, the processor 3 determines that the trace corresponding to the trace area has an undesired connection forming a short circuit (hereinafter referred to as "short-circuit trace area"), and converts the binary image to a converted image by assigning the second pixel value to all of the pixels of the binary image except for the short-circuit trace area. The trace corresponding to the short-circuit trace area has two trace segments interconnected by the undesired connection (such as forming an H-shape, as depicted by element 41 in FIG. 3). It should be noted that the image size of the converted image is identical to that of the binary image, i.e., 240×240 pixels.

Figure 3:
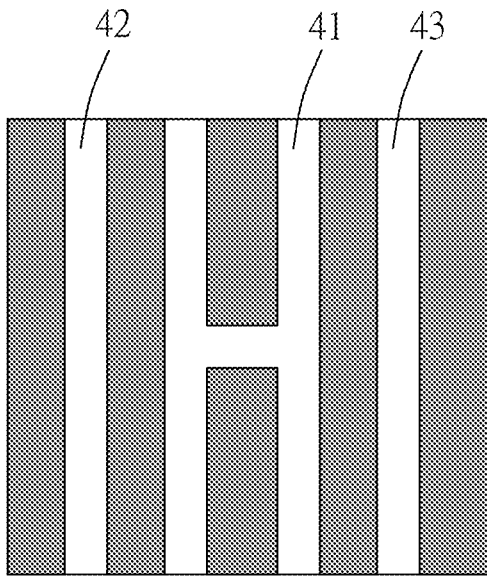
FIGS. 3 to 7 cooperatively illustrate an example of performing the method on an image of the PCB according to an embodiment of the disclosure.
Figure 4:
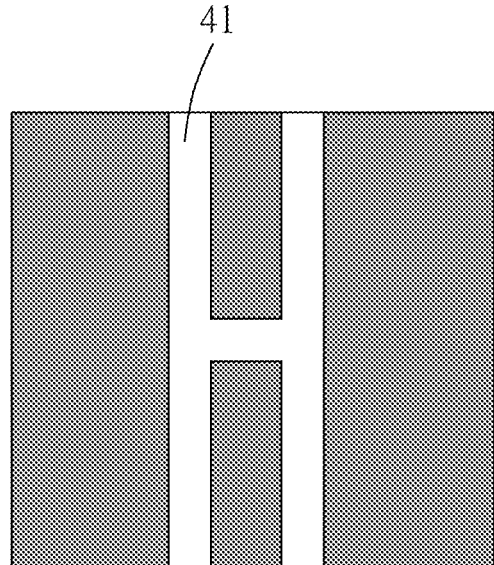

For example, three trace areas 41, 42 and 43 are identified in the binary image as shown in FIG. 3. One of the trace areas 41 contacts the external boundary of the binary image at four places and is determined to be the short-circuit trace area, and each of the other two of the trace areas 42 and 43 only contact the external boundary of the binary image at two places. Therefore, the processor 3 will assign the second pixel value to each pixel in the trace areas 42 and 43 in the binary image shown in FIG. 3 to result in the converted image shown in FIG. 4, where only the trace area 41 is left in the converted image. If more than one short-circuit trace area is identified in the binary image, the conversion of the binary image may be performed with respect to each short-circuit trace area separately in one embodiment of this disclosure (i.e., multiple converted images are formed respectively for the short-circuit traces), or may be performed with respect to all short-circuit trace areas together in another embodiment of this disclosure (i.e., one converted image is formed for all short-circuit areas).

Figure 5:
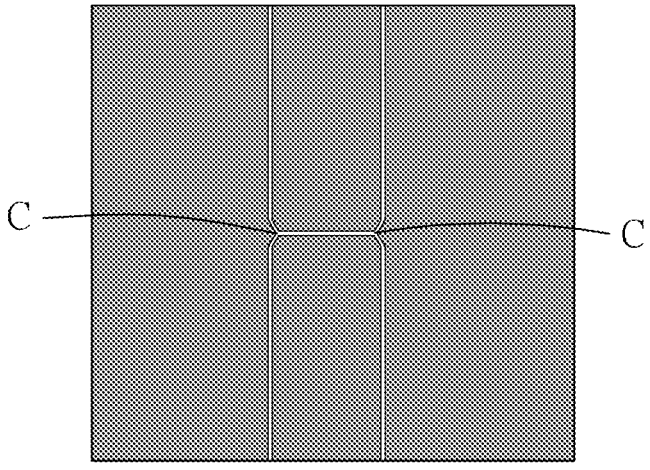

In step S6, the processor 3 performs skeletonization procedure (e.g., a medial axis transform) on the short-circuit trace area in the converted image to obtain a topological skeleton of the short-circuit trace area. It is worth to note that the topological skeleton of the short-circuit trace area is a path interconnecting centers of bi-tangent circles that touch the contour of the short-circuit trace area at two or more places. FIG. 5 illustrates an exemplary topological skeleton of the trace area 41.

In step S7, the processor 3 determines two fork points (C, C') in the topological skeleton, and obtains two coordinate sets respectively of the two fork points (C, C'). Each of the fork points (C, C') is an intersection of three branches of the topological skeleton. Then, the processor 3 outputs (e.g., by a display in a visual form) the two coordinate sets respectively of the two fork points (C, C'), where each of the two coordinate sets is expressed as a 2-tuple in a Cartesian coordinate system. Accordingly, locations that correspond to the two fork points (C, C') may be identified on the PCB based on the output of the two coordinate sets.

In step S8, the processor 3 determines a short-circuit region in the converted image. Specifically, step S8 includes the following operations.

Figure 6:
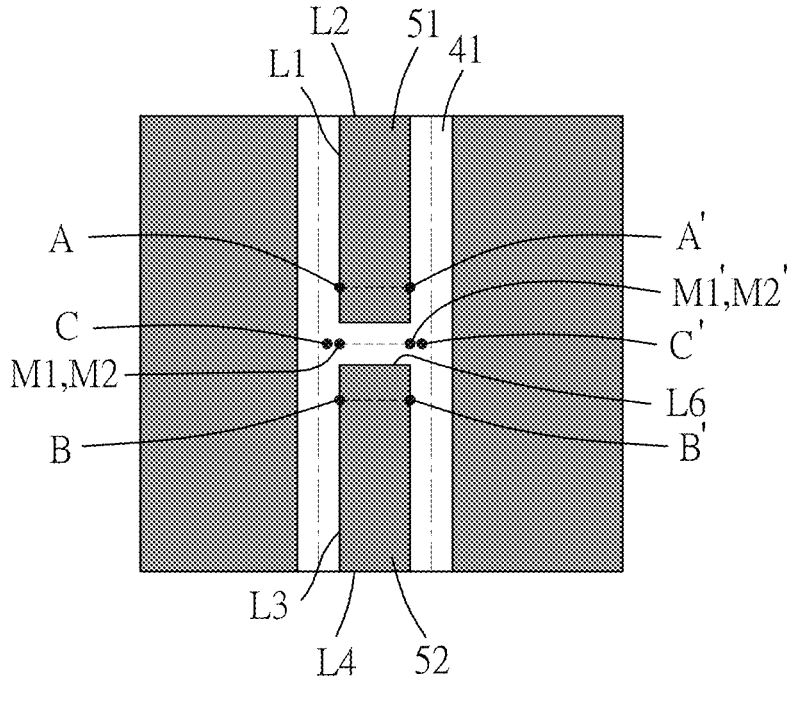

First, the processor 3 determines, on the converted image, two substrate areas corresponding respectively to two portions of the substrate of the PCB that are between the two trace segments of the trace corresponding to the short-circuit trace area and that are separated by the undesired connection. For example, two substrate areas 51 and 52 are determined as shown in FIG. 6. It is worth to note that a perimeter of the substrate area 51 is equal to a sum of a portion (L1) of the contour of the trace area 41 adjoining the substrate area 51 and a portion (L2) of the external boundary of the converted image adjoining the substrate area 51, where the portion (L1) of the contour of the trace area 41 is longer than the portion (L2) of the external boundary. The perimeter of the substrate area 52 is equal to a sum of another portion (L3) of the contour of the trace area 41 adjoining the substrate area 52 and another portion (L4) of the external boundary of the converted image adjoining the substrate area 52, where said another portion (L3) of the contour of the trace area 41 is longer than said another portion (L4) of the external boundary.

The processor 3 connects the two fork points (C, C') to form a reference line segment, and determines a pair of first reference points (A, A') respectively on two sides of one of the substrate areas 51 in a manner that the first reference points (A, A') form a first line segment having a central point spaced apart from a central point of the reference line segment by a predefined distance. The two sides of the substrate area 51 respectively adjoin two portions of the trace area 41 that correspond respectively to the trace segments. The first line segment terminating at the first reference points (A, A') is parallel to another side of the substrate area 51. Said another side of the substrate area 51 adjoins another portion of the trace area 41 that corresponds to the undesired connection. In this embodiment, the predefined distance is one half the distance between the two fork points (C, C'), but is not limited thereto.

Similarly, the processor 3 determines a pair of second reference points (B, B') respectively on two sides of the other one of the substrate areas 52 in a manner that the second reference points (B, B') form a second line segment having a central point spaced apart from the central point of the reference line segment by the predefined distance. The two sides of the substrate area 52 respectively adjoin the two portions of the trace area 41. The second line segment terminating at the second reference points (B, B') is parallel to another side of the substrate area 52. Said another side of the substrate area 52 adjoins said another portion of the trace area 41 that corresponds to the undesired connection.

In one embodiment, the first line segment terminating at the first reference points (A, A') and the second line segment terminating at the second reference points (B, B') are parallel to the reference line segment.

Subsequently, the processor 3 determines a pair of first terminal points (M1, M1') on the reference line segment in a manner that a distance between the first terminal points (M1, M1') is equal to a distance between the first reference points (A, A') and that a distance between the central point of the reference line segment and one of the first terminal points (M1, M1') is equal to a distance between the central point of the reference line segment and the other one of the first terminal points (M1, M1').

Similarly, the processor 3 determines a pair of second terminal points (M2, M2') on the reference line segment in a manner that a distance between the second terminal points (M2, M2') is equal to a distance between the second reference points (B, B') and that a distance between the central point of the reference line segment and one of the second terminal points (M2, M2') is equal to a distance between the central point of the reference line segment and the other one of the second terminal points (M2, M2').

Thereafter, the processor 3 determines the short-circuit region that is defined by the first and second terminal points (M1, M1', M2, M2') and the first and second reference points (A, A' and B, B') and that corresponds to the undesired connection. In particular, the processor 3 sequentially connects the first terminal point (M1), the first reference point (A), the other first reference point (A'), the other first terminal point (M1'), the second terminal point (M2'), the second reference point (B'), the other second reference point (B), the other second terminal point (M2) and back to the first terminal point (M1) so as to create a contour that bounds and defines the short-circuit region.

It is worth to note that in the example shown in FIG. 6, the first and second terminal points (M1 and M2) are located at the same location, and the first and second terminal points (M1' and M2') are at the same location. The contour that defines the short-circuit region has some segments overlapping the two sides of the substrate area 51, and some segments overlapping the two sides of the substrate area 52; that is to say, a line segment between the first reference point (A) and the first terminal point (M1) and a line segment between the first reference point (A') and the first terminal point (M1') respectively overlap the two sides of the substrate area 51, and a line segment between the second reference point (B) and the second terminal point (M2) and a line segment between the second reference point (B') and the second terminal point (M2') respectively overlap the two sides of the substrate area 52.

Figure 7:
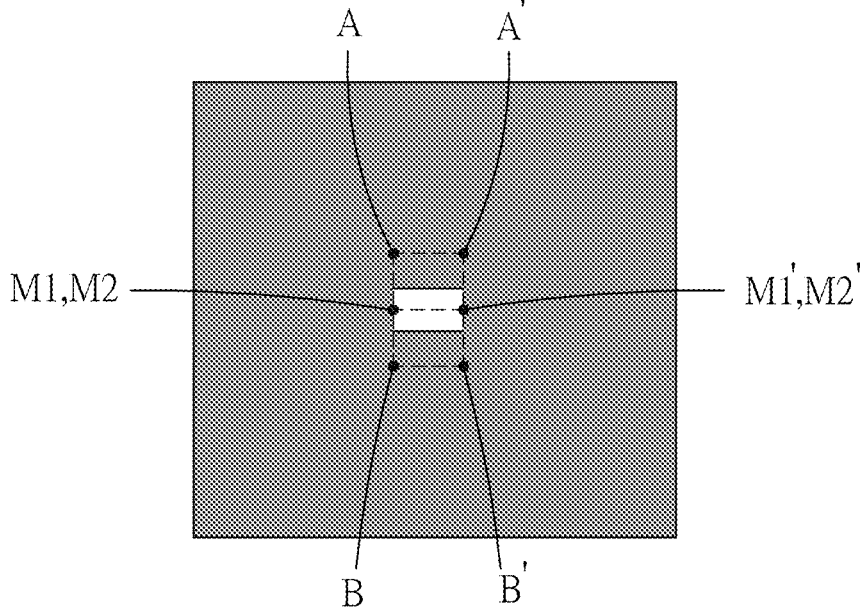

In step S9, the processor 3 converts the converted image to a short-circuit image (see FIG. 7) by assigning the second pixel value to each pixel of the converted image except for the short-circuit region. It should be noted that the image size of the short-circuit image is identical to that of the converted image, i.e., 240×240 pixels. Moreover, the processor 3 stores data related to all pixels (e.g., pixel values and coordinate sets of the pixels) in the short-circuit region in the storage device 2.

In step S10, the processor 3 outputs a coordinate set of each pixel having the first pixel value in the short-circuit image (i.e., each pixel in the short-circuit region). Accordingly, a location corresponding to the undesired connection on the PCB may be identified based on the output of the coordinate sets of the pixels of the short-circuit region.

In some embodiments, the method may be used to process a plurality of images capturing different portions of a same PCB so as to perform a full inspection on the PCB for finding potential defects (undesired connections). In some cases, one image may contain a portion of the PCB that is common to another image.

To sum up, for the method according to the disclosure, the detecting system 100 determines, based on a binary image of a PCB, that a trace corresponding to a trace area has an undesired connection forming a short circuit when it is determined that the trace area contacts an external boundary of the binary image at four places. Moreover, the detecting system 100 further determines a short-circuit region in the binary image which indicates a location of the undesired connection, and outputs a coordinate set of each pixel in the short-circuit region. Compared with conventional approaches of PCB defect defection, the method according to the disclosure is able to detect PCT defect without requiring a layout file related to a reference circuit, or a great amount of data for training a machine learning model.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for detecting an undesired connection forming a short circuit on a printed circuit board (PCB) based on an original image of the PCB, the PCB having a substrate on which a trace is formed, said method comprising steps of:

performing binarization on the original image to generate a binary image that has an external boundary;

identifying a trace area on the binary image, wherein the trace area corresponds to the trace of the PCB;

determining whether the trace area contacts the external boundary of the binary image at four places;

determining that the trace that corresponds to the trace area has an undesired connection forming a short circuit when it is determined that the trace area contacts the external boundary of the binary image at four places, wherein the trace area corresponding to the trace that has an undesired connection is a short-circuit trace area, and the trace corresponding to the short-circuit trace area has two trace segments interconnected by the undesired connection to form an H-shape;

converting the binary image to a converted image; and determining, on the converted image, two substrate areas corresponding respectively to two portions of the substrate that are between the trace segments and that are separated by the undesired connection, wherein for each of the substrate areas, the substrate area has a perimeter that is equal to a sum of a U-shape portion of a contour of the short-circuit trace area adjoining the substrate area and a straight-line portion of an external boundary of the converted image adjoining the substrate area, and the U-shape portion of the contour of the short-circuit trace is longer than the straight-line portion of the external boundary of the converted image.

2. The method as claimed in claim 1, wherein the step of identifying a trace area is to identify the trace area based on pixel values of the binary image.

3. The method as claimed in claim 1, wherein the step of identifying a trace area is to identify the trace area using edge detection to obtain a contour of the trace area.

4. The method as claimed in claim 1, wherein, in the step of performing binarization, the binary image has a plurality of pixels each having either a first pixel value or a second pixel value, and the trace area has a plurality of pixels each having the first pixel value, wherein:

the step of converting the binary image to a converted image is implemented when it is determined that the trace area contacts the external boundary of the binary image at four places, and is implemented by assigning the second pixel value to all of the pixels of the binary image except for the trace area.

5. The method as claimed in claim 4, further comprising a step of:

performing skeletonization procedure on the trace area in the converted image to obtain a topological skeleton of the trace area.

6. The method as claimed in claim 5, further comprising steps of:

determining two fork points in the topological skeleton, each of the fork points being an intersection of three branches of the topological skeleton; and obtaining two coordinate sets respectively of the two fork points.

7. The method as claimed in claim 6, further comprising steps of:

connecting the two fork points to form a reference line segment;

determining a pair of first reference points respectively on two sides of one of the substrate areas in a manner that the first reference points form a first line segment having a central point spaced apart from a central point of the reference line segment by a predefined distance, the two sides of said one of the substrate areas respectively adjoining two portions of the trace area that correspond respectively to the trace segments;

determining a pair of second reference points respectively on two sides of the other one of the substrate areas in a manner that the second reference points form a second line segment having a central point spaced apart from the central point of the reference line segment by the predefined distance, the two sides of said the other one of the substrate areas respectively adjoining the two portions of the trace area;

determining a pair of first terminal points on the reference line segment in a manner that a distance between the first terminal points is equal to a distance between the first reference points and that a distance between the central point of the reference line segment and one of the first terminal points is equal to a distance between the central point of the reference line segment and the other one of the first terminal points;

determining a pair of second terminal points on the reference line segment in a manner that a distance between the second terminal points is equal to a distance between the second reference points and that a distance between the central point of the reference line segment and one of the second terminal points is equal to a distance between the central point of the reference line segment and the other one of the second terminal points; and determining a short-circuit region that is defined by the first and second terminal points and the first and second reference points and that corresponds to the undesired connection.

8. The method as claimed in claim 7, wherein the predefined distance is one half the distance between the two fork points.

9. The method as claimed in claim 7, wherein the first line segment terminating at the first reference points is parallel to another side of said one of the substrate areas, said another side of said one of the substrate areas adjoining another portion of the trace area that corresponds to the undesired connection, wherein the second line segment terminating at the second reference points is parallel to another side of said the other one of the substrate areas, said another side of said the other one of the substrate areas adjoining said another portion of the trace area.

10. The method as claimed in claim 7, further comprising a step of converting the converted image to a short-circuit image by assigning the second pixel value to each pixel of the converted image except for the short-circuit region.

11. The method as claimed in claim 7, further comprising a step of outputting a coordinate set of each pixel having the first pixel value in the short-circuit image.

12. The method as claimed in claim 1, further comprising a step of determining a short-circuit region that corresponds to the undesired connection.

13. The method as claimed in claim 12, wherein the step of determining a short-circuit region includes sub-steps of:

performing skeletonization procedure on the trace area to obtain a topological skeleton of the trace area;

determining two fork points in the topological skeleton, each of the fork points being an intersection of three branches of the topological skeleton; and determining the short-circuit region according to the fork points.

14. The method as claimed in claim 13, wherein the sub-step of determining the short-circuit region includes determining two substrate areas corresponding respectively to two portions of the substrate that are between the trace segments and that are separated by the undesired connection, and further includes:

connecting the two fork points to form a reference line segment;

determining a pair of first reference points respectively on two sides of one of the substrate areas in a manner that the first reference points form a first line segment having a central point spaced apart from a central point of the reference line segment by a predefined distance, the two sides of said one of the substrate areas respectively adjoining two portions of the trace area that correspond respectively to the trace segments;

determining a pair of second reference points respectively on two sides of the other one of the substrate areas in a manner that the second reference points form a second line segment having a central point spaced apart from the central point of the reference line segment by the predefined distance, the two sides of said the other one of the substrate areas respectively adjoining the two portions of the trace area;

determining a pair of first terminal points on the reference line segment in a manner that a distance between the first terminal points is equal to a distance between the first reference points and that a distance between the central point of the reference line segment and one of the first terminal points is equal to a distance between the central point of the reference line segment and the other one of the first terminal points;

determining a pair of second terminal points on the reference line segment in a manner that a distance between the second terminal points is equal to a distance between the second reference points and that a distance between the central point of the reference line segment and one of the second terminal points is equal to a distance between the central point of the reference line segment and the other one of the second terminal points; and determining the short-circuit region that is defined by the first and second terminal points and the first and second reference points.

15. The method as claimed in claim 14, wherein:

in the step of performing binarization, the binary image has a plurality of pixels each having either a first pixel value or a second pixel value, and the trace area has a plurality of pixels each having the first pixel value;

the step of converting the binary image to a converted image is implemented when it is determined that the trace area contacts the external boundary of the binary image at four places, and is implemented by assigning the second pixel value to all of the pixels of the binary image except for the trace area;

the sub-steps of performing skeletonization procedure and determining the short-circuit region are implemented based on the converted image.

16. The method as claimed in claim 15, further comprising steps of:

obtaining a short-circuit image by assigning the second pixel value to each pixel of the converted image except for the short-circuit region; and outputting a coordinate set of each pixel having the first pixel value in the short-circuit image.

17. The method as claimed in claim 14, wherein the predefined distance is one half the distance between the two fork points.

18. The method as claimed in claim 14, wherein the first line segment terminating at the first reference points is parallel to another side of said one of the substrate areas, said another side of said one of the substrate areas adjoining another portion of the trace area that corresponds to the undesired connection, wherein the second line segment terminating at the second reference points is parallel to another side of said the other one of the substrate areas, said another side of said the other one of the substrate areas adjoining said another portion of the trace area.

* * * * *